US009223503B2

(12) United States Patent
Khan et al.

(10) Patent No.: US 9,223,503 B2
(45) Date of Patent: Dec. 29, 2015

(54) GENERATING RANDOM NUMBERS UTILIZING ENTROPIC NATURE OF NAND FLASH MEMORY MEDIUM

(71) Applicant: Intel Corporation, Santa Clara, CA (US)

(72) Inventors: Jawad B. Khan, Cornelius, OR (US); Knut S. Grimsrud, Forest Grove, OR (US); Darren D. Lasko, Forest, VA (US); Nathaniel G. Burke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/039,029

(22) Filed: Sep. 27, 2013

(65) Prior Publication Data

US 2015/0095550 A1    Apr. 2, 2015

(51) Int. Cl.
*G06F 3/06* (2006.01)
*G06F 7/58* (2006.01)
*G06F 12/02* (2006.01)
*G06F 21/72* (2013.01)

(52) U.S. Cl.
CPC .............. *G06F 3/061* (2013.01); *G06F 3/0647* (2013.01); *G06F 3/0679* (2013.01); *G06F 7/58* (2013.01); *G06F 7/582* (2013.01); *G06F 7/588* (2013.01); *G06F 12/0246* (2013.01); *G06F 21/72* (2013.01); *G06F 2212/2022* (2013.01)

(58) Field of Classification Search
None
See application file for complete search history.

(56) References Cited

U.S. PATENT DOCUMENTS

| 6,728,893 | B1 * | 4/2004 | Wells et al. ................... 713/324 |
|---|---|---|---|
| 7,550,858 | B1 * | 6/2009 | Drimer ........................ 257/781 |
| 7,633,808 | B2 * | 12/2009 | Ban ........................ 365/185.24 |
| 7,870,175 | B2 * | 1/2011 | Dichtl ........................... 708/250 |
| 8,370,719 | B2 * | 2/2013 | Nelson et al. ................. 714/773 |
| 2005/0172098 | A1 * | 8/2005 | Worley ......................... 711/206 |
| 2006/0026305 | A1 * | 2/2006 | Illowsky et al. ................. 710/8 |
| 2006/0080631 | A1 * | 4/2006 | Koo ............................... 716/17 |
| 2007/0140007 | A1 * | 6/2007 | Terauchi .................. 365/185.09 |
| 2009/0097345 | A1 * | 4/2009 | Kushnarenko ............... 365/201 |
| 2009/0113088 | A1 * | 4/2009 | Illowsky et al. ............... 710/62 |
| 2009/0228739 | A1 * | 9/2009 | Cohen et al. ..................... 714/6 |
| 2013/0282781 | A1 * | 10/2013 | Park et al. .................... 708/250 |
| 2015/0169247 | A1 * | 6/2015 | Wang et al. ................... 711/103 |
| 2015/0193204 | A1 * | 7/2015 | Lin et al. ...................... 708/250 |

OTHER PUBLICATIONS

'Flash Memory for Ubiquitous Hardware Security Functions: True Random No. Generation and Device Fingerprints' by Yinglei Wang, 2012 IEEE Symposium on Security and Privacy, copyright 2012, Yinglei Wang.*
'Solaris Random No. Generation' by Darren Moffat, Sep. 12, 2013.*

(Continued)

*Primary Examiner* — Steven Snyder
(74) *Attorney, Agent, or Firm* — Alpine Technology Law Group LLC (57) ABSTRACT

Methods and apparatus related to generating random numbers utilizing the entropic nature of NAND flash memory medium are described. In one embodiment, a data pattern is written to a portion of a non-volatile memory device and is subsequently read multiple times. Based on the read operations, at least one bit is marked for random number generation based at least partially on comparison of a number of flips by the at least one bit and a threshold value. Other embodiments are also disclosed and claimed.

21 Claims, 7 Drawing Sheets

(56) References Cited

OTHER PUBLICATIONS

'RESP: A Robust Physical Unclonable Function Retrofitted into Embedded SRAM Array' by Yu Zheng et al., DAC'13, May 29-Jun. 7, 2013.*

'Power-Up SRAM State as an Identifying Fingerprint and Source of True Random Numbers' by Daniel E. Holcomb et al., IEEE Transactions on Computers, vol. 58, No. 9, Sep. 2009.*

'OASIS: On Achieving a Sanctuary for Integrity and Secrecy on Untrusted Platforms' by Emmanuel Owusu et al., CCS'13, Nov. 4-8, 2013.*

'Providing Root of Trust for ARM TrustZone using On-Chip SRAM' by Shijun Zhao et al., TrustED'14, Nov. 3, 2014.*

'Efficient Implementation of True Random No. Generator based on SRAM PUFs' by Vincent van der Leest et al., Cryptography and Security, pp. 300-318, Springer-Verlag Berlin, copyright Heidelberg 2012.*

Evaluation of VIA C3 Nehemiah Random Number Generator, paper, Feb. 27, 2003, 41 pages, Gryptography Research, Inc., San Francisco, CA, USA.

* cited by examiner

GENERATING RANDOM NUMBERS UTILIZING ENTROPIC NATURE OF NAND FLASH MEMORY MEDIUM

FIELD

The present disclosure generally relates to the field of electronics. More particularly, some embodiments generally relate to generating random numbers utilizing the entropic nature of NAND flash memory medium.

BACKGROUND

In computing, random number generation is used to support cryptographic functions (such as data encryption and decryption). In some implementations, a dedicated hardware device is used to generate random numbers. This, in turn, adds to the cost of a computing system and may also add to its hardware complexity.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

To increase performance, some computing systems utilize a Solid State Drive (SSD) that includes non-volatile memory such as flash memory (for example, NAND flash memory) to provide a non-volatile storage solution. Such SSDs generally take less space, weigh less, are more reliable (e.g., due to the lack of moving parts), and are faster than more traditional hard disk drives (HDDs). Furthermore, hard disk drives provide a relatively low-cost storage solution and are used in many computing devices to provide non-volatile storage. Hard disk drives, however, can use a lot of power when compared to Solid State Drives since a hard disk drive needs to spin its rotating disks at a relatively high speed and move disk heads relative to the spinning disks to read/write data. All this physical movement generates heat, increases power consumption, and makes access times much slower. To this end, some mobile devices are migrating towards solid state drives. Also, some non-mobile computing systems (such as desktops, workstations, servers, etc.) may utilize such solid state drives to improve performance.

Devices that perform cryptographic functions need to be able to generate high-quality random values for uses such as cryptographic keys, nonces, and initialization vectors. Being able to generate unguessable and unpredictable random numbers is at the foundation of the security for such devices. This involves a high-quality entropy source (also sometimes called a noise source) which is used to seed a cryptographic Pseudo Random Number Generator (PRNG). Common approaches for collecting entropy include measurement of physical processes, such as thermal, photoelectric, and quantum phenomena.

Some embodiments provide techniques for generating random numbers based on the entropic nature of NAND flash memory medium. As discussed herein, flash memory "medium" refers to the actual memory cells that store bits of data in a flash memory device. Although some embodiments are discussed with reference to an SSD having NAND medium, embodiments are not limited to NAND technology and may be expanded to other non-volatile memory technologies (e.g., NOR (Not OR)) and other threshold-sensing storage technology, as will be further discussed herein. For example, such solid state drives (SSDs) may include flash memory, for example, NAND flash memory and/or NOR flash memory (also referred to herein interchangeably as a solid state storage device), Phase Change Memory (PCM), Spin Torque Transfer Random Access Memory (STTRAM), Resistive Random Access Memory, 3D (3-Dimensional) Cross Point Memory, etc. In an embodiment, a random seed is generated which is unguessable and/or unique to each device, and can be used for generating various encryption keys in a drive such as in the SSD and/or thumb-drives (such as a USB (Universal Serial Bus) thumb drive). With such techniques, there is no need for extra dedicated hardware in the SSD to create random seeds, and the hardware complexity of the random number generation is reduced by leveraging existing NAND read and program mechanisms for creating unlimited random seeds per SSD.

An embodiment operates based on program/write and read operations targeting a portion of a NAND memory (which may be fully controllable by logic and/or (e.g., on-chip) processor(s)/core(s)). The targeted portion of the NAND memory device may be any portion of the NAND memory including, for example, a cell, a block, page, bank, etc. Furthermore, the random numbers generated in accordance with various embodiments may be used in several applications including gambling, statistical sampling, computer simulation, cryptography, completely randomized design, etc.

Moreover, any storage technology that relies on a threshold voltage to distinguish between states may be used in place of NAND memory's entropic nature. For example, some embodiments may utilize any threshold-sensing storage technology to generate random seeds, e.g., provided that the threshold-sensing storage technology is implemented such that there is a way to change the threshold value. Such threshold-sensing storage technology may include SLC (Single Level Cell, where each cell is capable of storing a 0 or 1 only) and MLC (Multiple Level Cell, where each cell is capable of storing a plurality of levels as will be further discussed with reference to FIG. 3) technologies, e.g., provided the threshold voltage may be adjusted to create a statistically random distribution with suitable entropy for random number generation.

Figure 1:
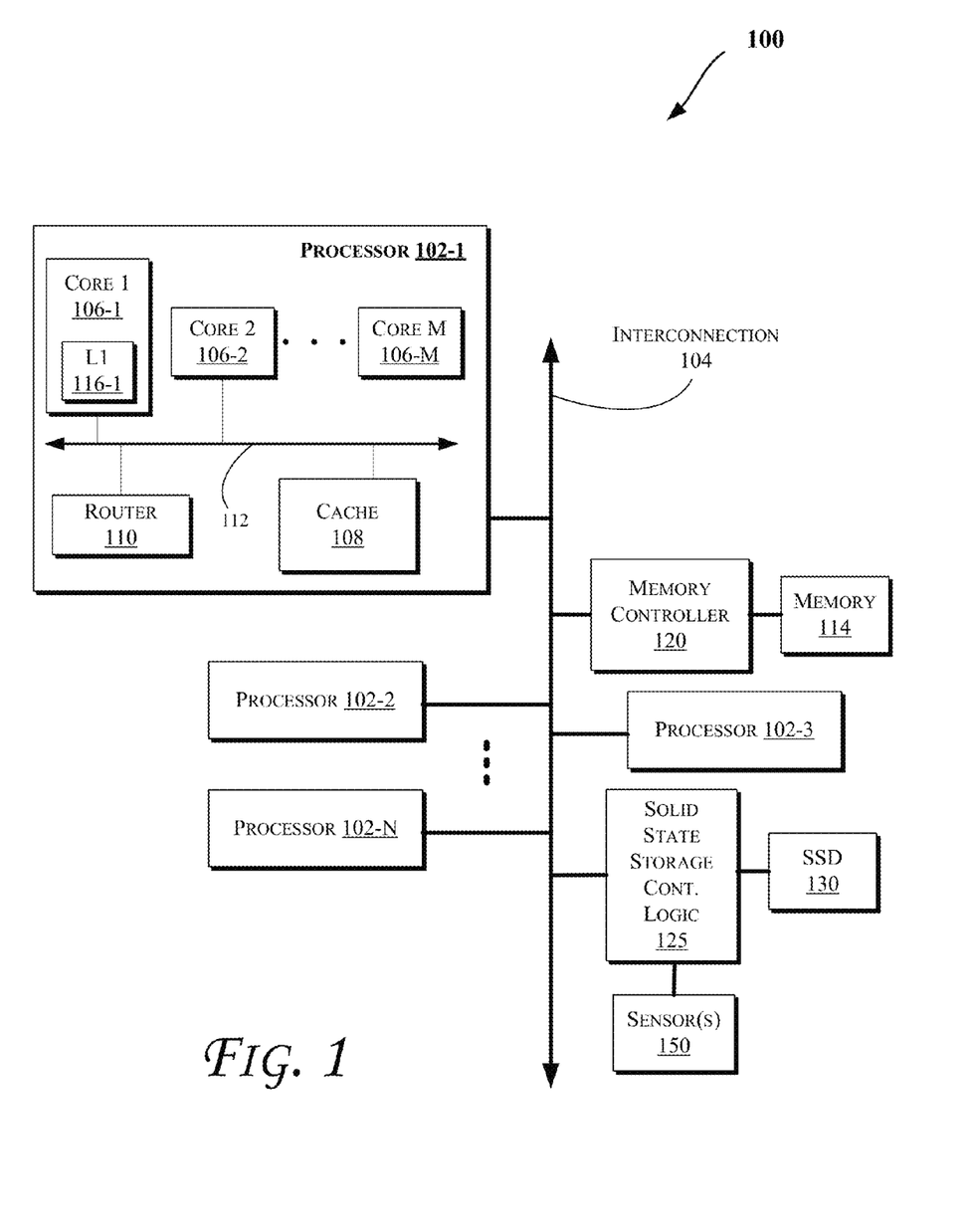
FIGS. 1 and 5-7 illustrate block diagrams of embodiments of computing systems, which may be utilized to implement various embodiments discussed herein.

The techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, etc.), including those discussed with reference to FIGS. 1-7. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 120, memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Memory 114 may include Non-Volatile Memory (NVM) such as flash memory (or a solid state storage device, including an SSD), PCM, STTRAM, Resistive Random Access Memory, 3D Cross Point Memory, etc. in some embodiments. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments. Also, in some embodiments, system 100 may include logic (e.g., solid state storage controller logic 125) to control access to one or more NVM or Non-Volatile Memory (including one or more solid state storage) devices (such as one or more SSDs 130, further discussed with reference to FIG. 2), where the one or more NVM devices may be provided on the same integrated circuit die in some embodiments). Furthermore, even though logic 125 is shown to be directly coupled to the interconnection 104 in FIG. 1, logic 125 can alternatively communicate via a storage bus/interconnect (such as the SATA (Serial Advanced Technology Attachment) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 5-6), etc.). Additionally, logic 125 may be incorporated into a memory controller logic (such as those discussed with reference to FIGS. 1 and 5-7) or provided on a same integrated circuit device in various embodiments.

Furthermore, logic 125 may be coupled to one or more sensors 150 to receive information (e.g., in the form of one or more bits or signals) to indicate the status of or values detected by the one or more sensors 150. The sensor(s) 150 may be provided proximate to components of system 100 (or other computing systems discussed herein such as those discussed with reference to other figures including 5-7, for example), including the cores 106, interconnections 104 or 112, components outside of the processor 102, SSD, SSD bus, SATA bus, logic 125, etc., to sense variations in various factors affecting power/thermal behavior of the system/platform, such as temperature, operating frequency, operating voltage, power consumption, and/or inter-core communication activity, etc.

Figure 2:
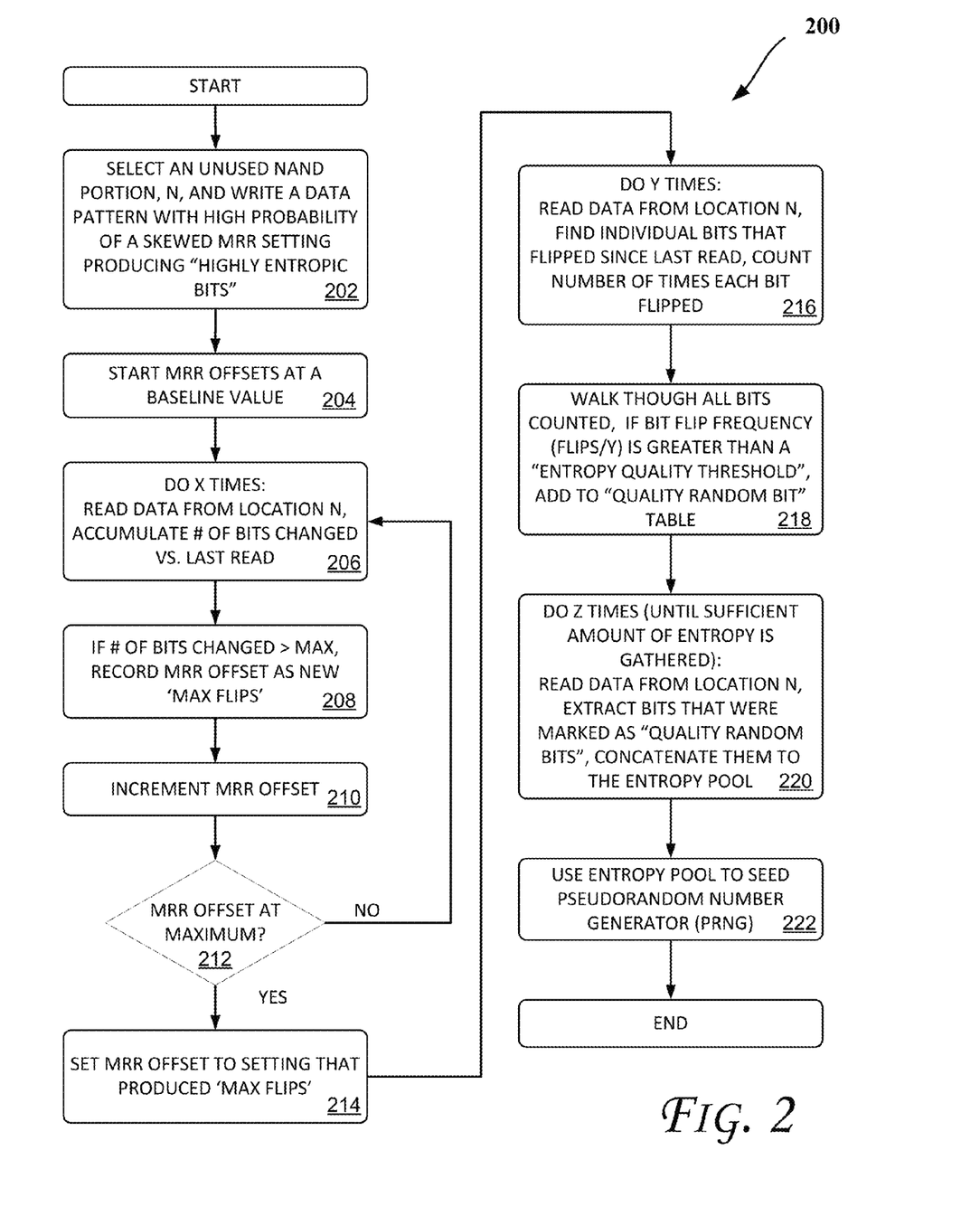
FIG. 2 illustrates a flow diagram of a method to generate random numbers utilizing the entropic nature of NAND medium, according to an embodiment.

FIG. 2 illustrates a flow diagram of a method 200 to generate random numbers utilizing the entropic nature of NAND medium, according to an embodiment. In an embodiment, one or more components of the other figures (e.g., FIG. 1 or 4-7) such as the SSD controller logic 125 (e.g., via a SATA or PCIe bus), controller 482, and/or processor/cores (of FIG. 1 or 4-7) may be used to perform one or more of the operations of FIG. 2.

More specifically, the inherent random processes in the NAND itself are used as a source of entropy for generating unique random numbers for each SSD. By utilizing this mechanism, the SSD can generate random numbers, without the need of a specialized random number generator. For example, each NAND cell has inherent specific physical characteristics for storing and retrieving charge. These physical characteristics vary from cell to cell, page to page, block to block, and device to device. This variability is a excellent source for entropy for generating a random number. For example, FIG. 2 illustrates a high-level flow diagram for using Moving Read Reference (MRR) to collect entropy of a NAND flash memory in an SSD.

Referring to FIGS. 1-2, at an operation 202, an unused NAND portion in the SSD (e.g., block N) is selected and a data pattern with a high probability of skewed MRR setting producing highly entropic bits is written to the selected portion. While FIG. 2 generally discusses NAND blocks, other portions of the NAND medium (e.g., cell, page, bank, etc.) may also be used to perform method 200. At an operation 204, the MRR offsets are started at a baseline value. At an operation 206, data is read a select number of times (e.g., X number of times) from location N and the number of bits that changed since the last read operation are accumulated.

At an operation 208, if the number of bits changed is greater than a threshold value (e.g., "Max" which is initialized in step 204 to zero), the new MRR offset is marked/ stored/recorded as a new threshold value (or "Max Flips"). If the MRR offset is at maximum threshold value at operation 212, the MRR offset is set to the value that produced the Max Flips at operation 214; otherwise, method 200 resumes with operation 206.

At an operation 216, data is read from location N for a select number of times (e.g., Y times), it is determined which individual bit(s) flipped since the last read operation, and the number of times each bit has been flipped is counted/summed. At an operation 218, each counted bit number is then considered to determine if the bit flip frequency (e.g., number of flips over Y or flips/Y) is greater than some entropy quality threshold value. If so, the corresponding bit (e.g., its address) is added to a quality random bit list (e.g., that may be implemented as a table including the bit identity/address, and optionally the counted number of flips for that bit).

At an operation 220, data is read from location N for a select number of times (e.g., Z times, or until sufficient amount of entropy is gathered) and only the bits that were marked as quality random bits (e.g., in the list or table discussed with reference to operation 218) are used. The extracted bits are added/concatenated to the entropy pool (e.g., which may be stored in any of the memory devices discussed herein, for example, with reference to FIG. 1 or 4-7). The entropy pool information may then be used to seed pseudorandom numbers at an operation 222. Also, while method 200 is discussed with reference to various number of read operations (i.e., x, y, and z), one or more of these read operations may be performed the same number of times (i.e., one or more of x, y, or z, may be the same).

Figure 3:
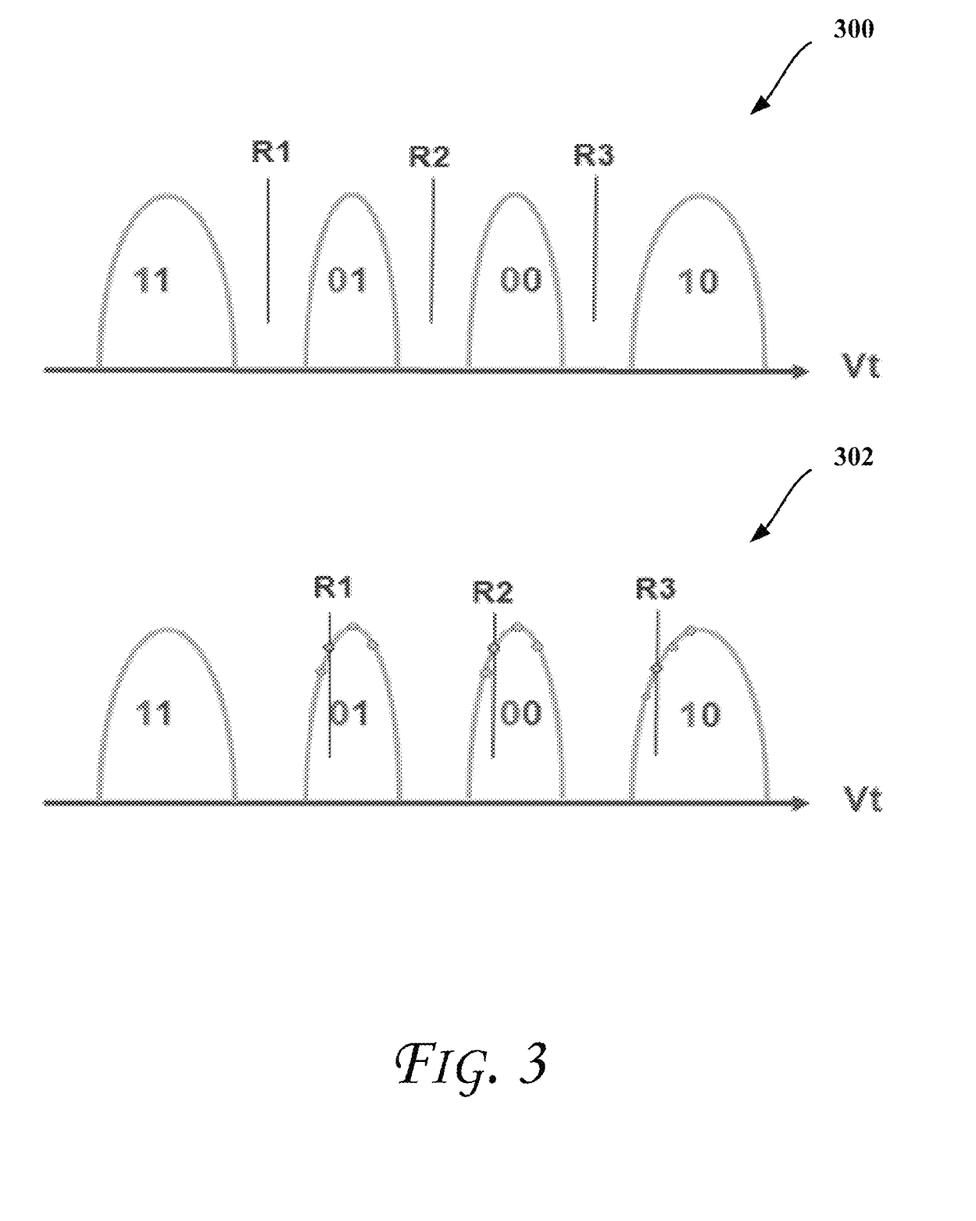
FIG. 3 illustrates sample graphs of NAND MLC programming level distributions, according to some embodiments.

FIG. 3 illustrates sample graphs 300 and 302 of NAND MLC programming level distributions with Moving Read Reference (MRR) control, according to some embodiments. Graphs 300 and 302 (where "Vt" refers to reference voltage) illustrate how MRR can be utilized to obtain unstable (random) results when reading the NAND values. Three read reference levels (R1-R3) are shown in FIG. 3 for illustrative purposes. Also, FIG. 3 generally discusses an MLC (Multiple Level Cell, where each cell is capable of storing a plurality of levels, 2-bits representing four levels 11, 01, 00, and 10, for example). However, embodiments are not limited to MLC and the threshold-sensing storage technology used for random number generation may include SLC (Single Level Cell, where each cell is capable of storing a 0 or 1 only) technology, e.g., provided the threshold voltage may be adjusted to locate it sufficiently near the middle of the distribution in order to provide some noise for random number generation.

In normal operation, the MRR values are set such that they are between the distributions of voltages (see, e.g., graph 300). To obtain random results, the MRR values are set such that the reference voltages fall within the distribution of NAND cell voltages (see, e.g., graph 302). In graph 302, the dots around the read reference levels R1-R3 represent the sample values that might be programmed into different cells that lie on that distribution. The reference levels are provided at a spot where there are some values in the distribution that are so close to the threshold voltage (e.g., on top of it) that the noise in the system impacts whether a read operation detects it as being on one side of the threshold or the other. This will cause the sense amplifiers of the NAND device to sometimes detect a 0, and sometimes detect a 1, e.g., based on phenomena such as thermal noise. For example, if a 512 bit random seed is required, the final loop of the method 200 (i.e., operation 220) can be iterated until 512 bits are collected.

Moreover, whenever a key change is requested, a new random number is needed. For example, data stored in an SSD can be encrypted based on a "key" (or "passcode"), where the key is generated based on a random number. This is usually accomplished using a hardware random number generator circuit. However, by using the technique(s) discussed herein, no such dedicated hardware circuit is needed. For example, an onboard logic or processor may be used to generated random number(s) based on the NAND memory operations. In addition, there is no limit on the total number of random numbers that can be generated by any given SSD.

Figure 4:
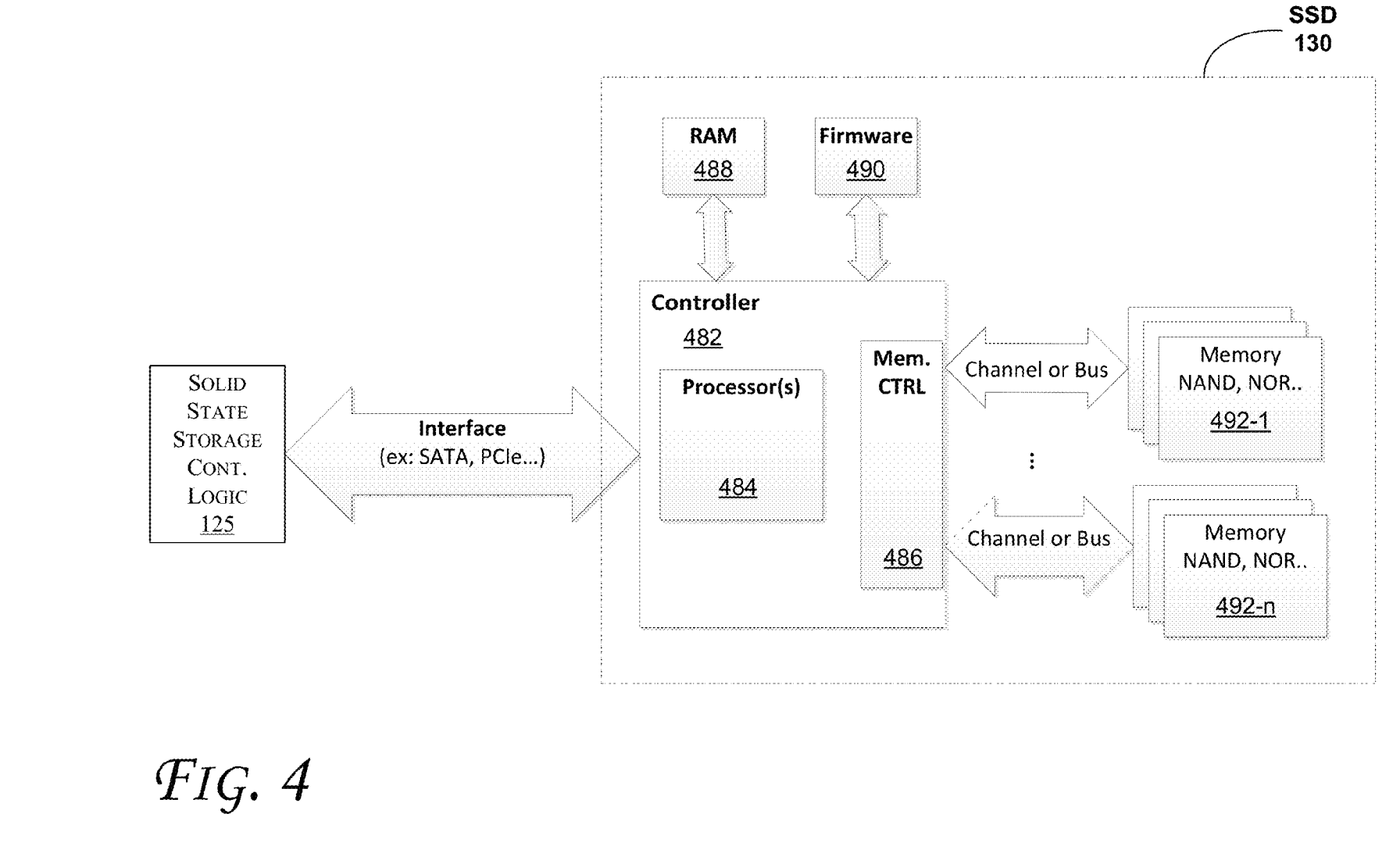
FIG. 4 illustrates a block diagram of various components of an SSD, according to an embodiment.

FIG. 4 illustrates a block diagram of various components of an SSD, according to an embodiment. As shown in FIG. 4, SSD 130 includes a controller logic 482 (which in turn includes one or more processor cores or processors 484 and a memory controller logic 486), Random Access Memory (RAM) 488, firmware storage 490, and one or more memory modules 492-1 to 492-n (which may include NAND, NOR, or other types of non-volatile memory). Memory modules 492-1 to 492-n are coupled to the memory controller logic 486 via one or more memory channels or busses. Also, SSD 130 communicates with logic 125 via an interface (such as a SATA, PCIe (Peripheral Component Interconnect express), etc. interface). One or more of the operations discussed with reference to FIG. 2 may be performed by one or more of the components of FIG. 4 (e.g., processors 484 and/or controller 482 may cause performance of the read operations from memory modules 492-1 to 492-n to generate random numbers. Also, one or more of the operations of FIG. 2 may be programmed into the firmware 490.

Figure 5:
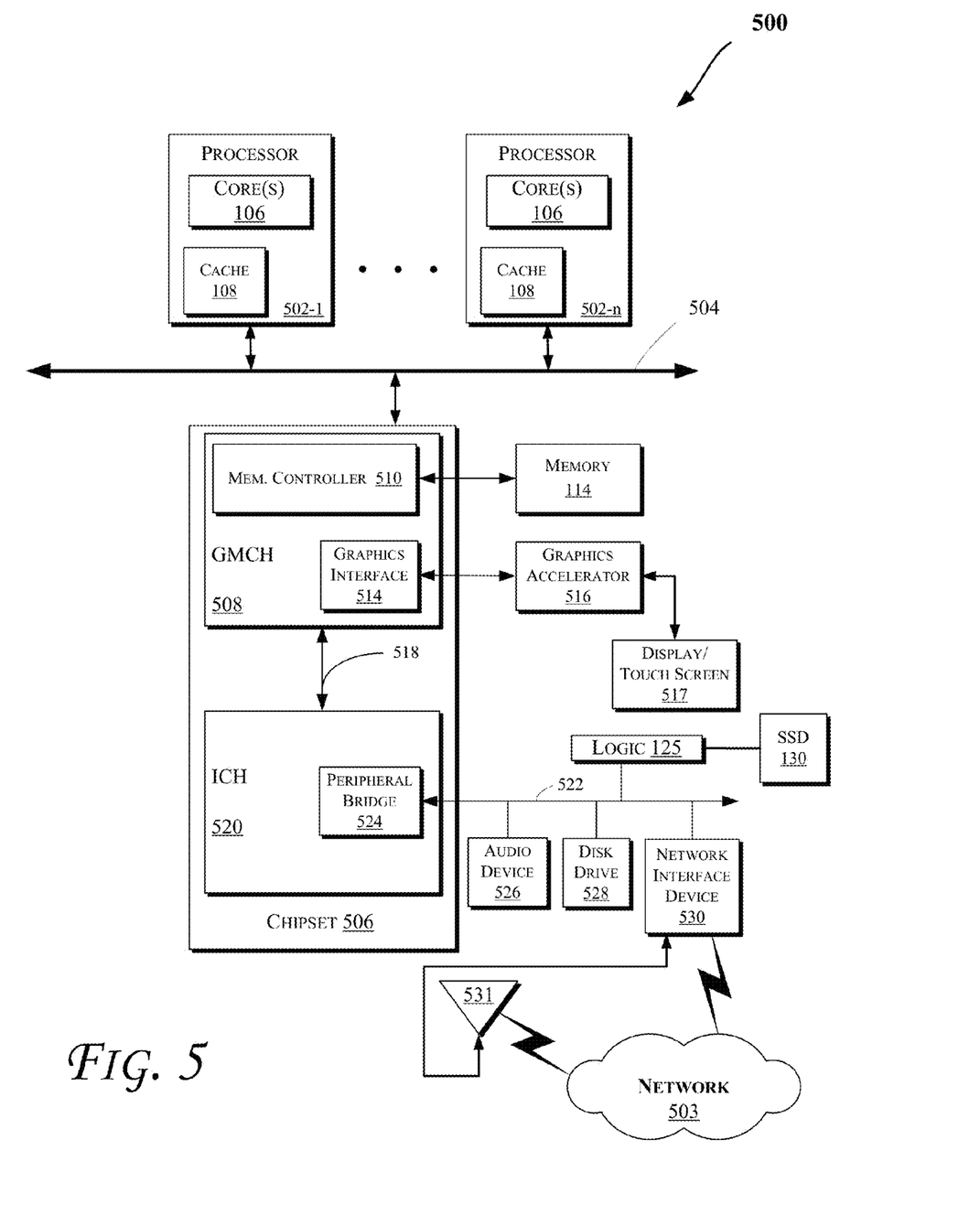

FIG. 5 illustrates a block diagram of a computing system 500 in accordance with an embodiment. The computing system 500 may include one or more central processing unit(s) (CPUs) 502 or processors that communicate via an interconnection network (or bus) 504. The processors 502 may include a general purpose processor, a network processor (that processes data communicated over a computer network 503), an application processor (such as those used in cell phones, smart phones, etc.), or other types of a processor (including a reduced instruction set computer (RISC) processor or a complex instruction set computer (CISC)). Various types of computer networks 503 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 5G, Low Power Embedded (LPE), etc.). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment) that communicates with the memory 114. The memory 114 may store data, including sequences of instructions that are executed by the CPU 502, or any other device included in the computing system 500. Also, system 500 includes logic 125 and SSD 130 (which may be coupled to system 500 via bus 522 such as illustrated, via other interconnects such as 504, where logic 125 is incorporated into chipset 506, etc. in various embodiments). In one embodiment, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk, flash, PCM, 3D Cross Point Memory, Resistive Random Access Memory, and STTRAM. Additional devices may communicate via the interconnection network 504, such as multiple CPUs and/or multiple system memories.

The GMCH 508 may also include a graphics interface 514 that communicates with a graphics accelerator 516. In one embodiment, the graphics interface 514 may communicate with the graphics accelerator 516 via an accelerated graphics port (AGP) or Peripheral Component Interconnect (PCI) (or PCI express (PCIe) interface). In an embodiment, a display 517 (such as a flat panel display, touch screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 517.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interface). As shown, the network interface device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 5G, LPE, etc.) communicate with the network 503. Other devices may communicate via the bus 522. Also, various components (such as the network interface device 530) may communicate with the GMCH 508 in some embodiments. In addition, the processor 502 and the GMCH 508 may be combined to form a single chip. Furthermore, the graphics accelerator 516 may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
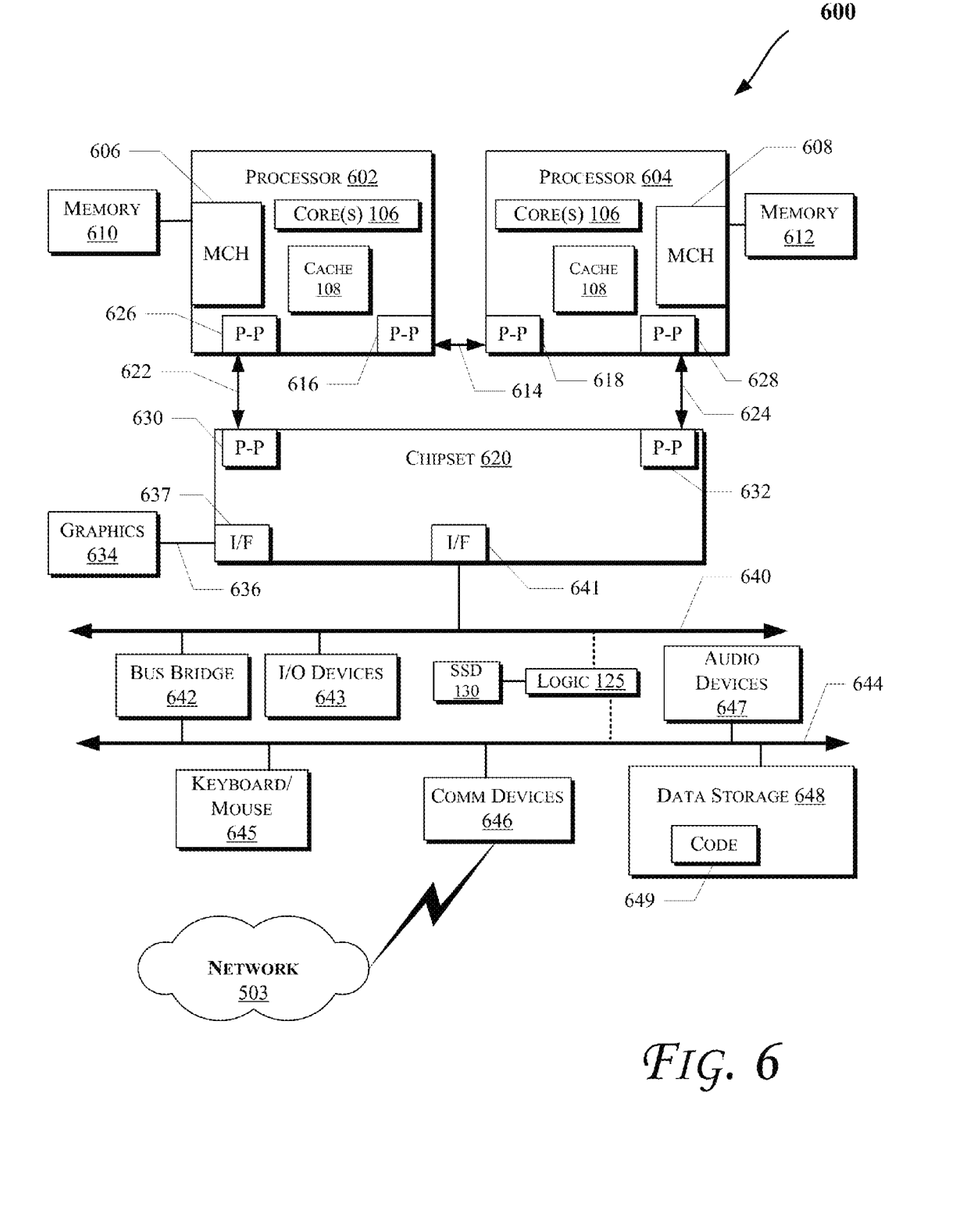

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 in some embodiments. Furthermore, system 600 includes logic 125 and SSD 130 (which may be coupled to system 600 via bus 640/644 such as illustrated, via other point-to-point connections to the processor(s) 602/604 or chipset 620, where logic 125 is incorporated into chipset 620, etc. in various embodiments).

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG. 5, the graphics interface 636 may be coupled to a display device (e.g., display 517) in some embodiments.

As shown in FIG. 6, one or more of the cores 106 and/or cache 108 of FIG. 1 may be located within the processors 602 and 604. Other embodiments, however, may exist in other circuits, logic units, or devices within the system 600 of FIG. 6. Furthermore, other embodiments may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503, as discussed with reference to network interface device 530 for example, including via antenna 531), audio I/O device, and/or a data storage device 648. The data storage device 648 may store code 649 that may be executed by the processors 602 and/or 604.

Figure 7:
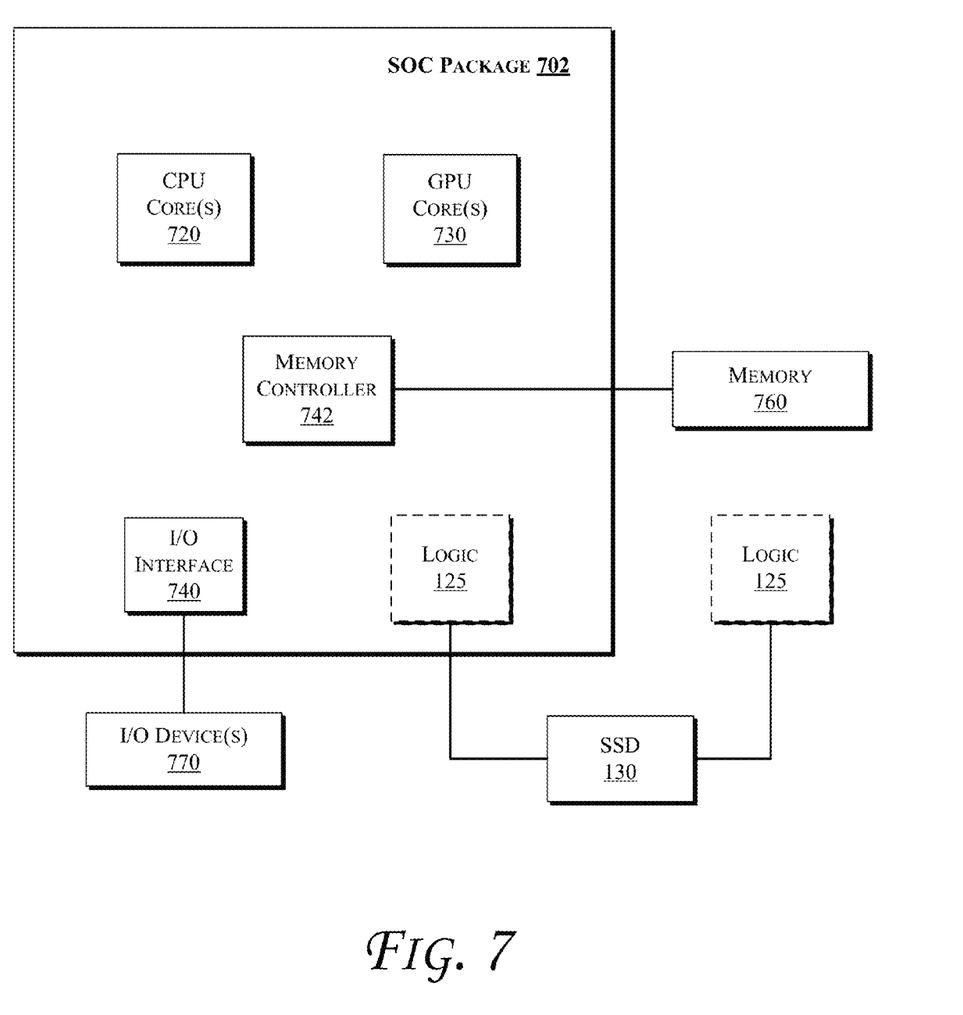

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged onto a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 125 in an embodiment. Alternatively, the logic 125 may be provided outside of the SOC package 702 (i.e., as a discrete logic).

The following examples pertain to further embodiments. Example 1 includes an apparatus comprising: logic to write a data pattern to a portion of a non-volatile memory device; and logic to read one or more bits from the portion of the non-volatile memory device a first number of times, wherein at least one bit of the one or more bits are to be marked for random number generation based at least partially on comparison of a number of flips by the at least one bit and a threshold value. Example 2 includes the apparatus of example 1, further comprising memory to store the number of flips by the at least one bit and location information of the at least one bit. Example 3 includes the apparatus of example 1, wherein the threshold value is to comprise an entropy quality threshold value. Example 4 includes the apparatus of example 1, wherein logic to read the one or more bits is to detect different states for the at least one bit based at least partially on thermal noise. Example 5 includes the apparatus of example 1, wherein the portion of the non-volatile memory device is to comprise an unused portion of the non-volatile memory device. Example 6 includes the apparatus of example 1, wherein the data pattern has a high probability of producing highly entropic bits. Example 7 includes the apparatus of example 1, wherein the non-volatile memory device is to comprise one or more of: a solid state device (SSD), a phase change memory, a 3D (3-Dimensional) cross point memory, a resistive random access memory, and a spin torque transfer random access memory. Example 8 includes the apparatus of example 1, wherein a memory controller is to comprise the logic to read or the logic to write. Example 9 includes the apparatus of example 1, wherein one or more of the logic to read, the logic to write, the non-volatile memory device, and a processor core are on a same integrated circuit die.

Example 10 includes a method comprising: writing a data pattern to a portion of a non-volatile memory device; and reading one or more bits from the portion of the non-volatile memory device a first number of times, wherein at least one bit of the one or more bits are to be marked for random number generation based at least partially on comparison of a number of flips by the at least one bit and a threshold value. Example 11 includes the method of example 10, further comprising storing the number of flips by the at least one bit and location information of the at least one bit. Example 12 includes the method of example 10, wherein the threshold value comprises an entropy quality threshold value. Example 13 includes the method of example 10, further comprising detecting different states for the at least one bit based at least partially on thermal noise. Example 14 includes the method of example 10, wherein the portion of the non-volatile memory device comprises an unused portion of the non-volatile memory device. Example 15 includes the method of example 10, wherein the data pattern has a high probability of producing highly entropic bits. Example 16 includes the method of example 10, wherein the non-volatile memory device comprises one or more of: a solid state device (SSD), a phase change memory, a 3D (3-Dimensional) cross point memory, a resistive random access memory, and a spin torque transfer random access memory.

Example 17 includes a system comprising: one or more non-volatile memory devices; at least one processor core to access the one or more non-volatile memory devices; logic to write a data pattern to a portion of the non-volatile memory device; and logic to read one or more bits from the portion of the non-volatile memory device a first number of times, wherein at least one bit of the one or more bits are to be marked for random number generation based at least partially on comparison of a number of flips by the at least one bit and a threshold value. Example 18 includes the system of example 17, further comprising memory to store the number of flips by the at least one bit and location information of the at least one bit. Example 19 includes the system of example 17, wherein the threshold value is to comprise an entropy quality threshold value. Example 20 includes the apparatus of any of example 1 to 8, wherein one or more of the logic to read, the logic to write, the non-volatile memory device, and a processor core are on a same integrated circuit die.

Example 21 includes a computer-readable medium comprising one or more instructions that when executed on a processor configure the processor to perform one or more operations of any of examples 10 to 16.

Example 22 includes an apparatus comprising means for performing one or more operations of any of examples 10 to 16.

In various embodiments, the operations discussed herein, e.g., with reference to FIGS. 1-7, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to write a data pattern to a portion of a non-volatile memory device;
   logic to read one or more bits from the portion of the non-volatile memory device a first number of times and a second number of times, wherein at least one bit of the one or more bits are to be marked for random number generation based at least partially on comparison of a number of flips by the at least one bit and a threshold value, wherein the number of flips by the at least one bit is to be determined based at least in part on read operations to be performed during the first number of times and the second number of times; and
   logic to update a moving read reference (MRR) offset value based at least partially on comparison of a threshold number of flips and the determined number of flips by the at least one bit, wherein the MRR offset value is to be updated after the read operations to be performed during the first number of times and before the read operations to be performed during the second number of times.

2. The apparatus of claim 1, further comprising memory to store the number of flips by the at least one bit and location information of the at least one bit.

3. The apparatus of claim 1, wherein the threshold value is to comprise an entropy quality threshold value.

4. The apparatus of claim 1, wherein logic to read the one or more bits is to detect different states for the at least one bit based at least partially on thermal noise.

5. The apparatus of claim 1, wherein the portion of the non-volatile memory device is to comprise an unused portion of the non-volatile memory device.

6. The apparatus of claim 1, wherein the data pattern has a high probability to produce highly entropic bits.

7. The apparatus of claim 1, wherein the non-volatile memory device is to comprise one or more of: a solid state device (SSD), a phase change memory, a 3D (3-Dimensional) cross point memory, a resistive random access memory, and a spin torque transfer random access memory.

8. The apparatus of claim 1, wherein a memory controller is to comprise the logic to read or the logic to write.

9. The apparatus of claim 1, wherein one or more of the logic to read, the logic to write, the non-volatile memory device, and a processor core are on a same integrated circuit die.

10. A method comprising:
    writing a data pattern to a portion of a non-volatile memory device;
    reading one or more bits from the portion of the non-volatile memory device a first number of times and a second number of times,
    wherein at least one bit of the one or more bits are marked for random number generation based at least partially on comparison of a number of flips by the at least one bit and a threshold value, wherein the number of flips by the at least one bit is determined based at least in part on read operations performed during the first number of times and the second number of times; and
    updating a moving read reference (MRR) offset value based at least partially on comparison of a threshold number of flips and the determined number of flips by the at least one bit, wherein the MRR offset value is updated after the read operations performed during the first number of times and before the read operations performed during the second number of times.

11. The method of claim 10, further comprising storing the number of flips by the at least one bit and location information of the at least one bit.

12. The method of claim 10, wherein the threshold value comprises an entropy quality threshold value.

13. The method of claim 10, further comprising detecting different states for the at least one bit based at least partially on thermal noise.

14. The method of claim 10, wherein the portion of the non-volatile memory device comprises an unused portion of the non-volatile memory device.

15. The method of claim 10, wherein the data pattern has a high probability of producing highly entropic bits.

16. The method of claim 10, wherein the non-volatile memory device comprises one or more of: a solid state device (SSD), a phase change memory, a 3D (3-Dimensional) cross point memory, a resistive random access memory, and a spin torque transfer random access memory.

17. A system comprising:
    one or more non-volatile memory devices;
    at least one processor core to access the one or more non-volatile memory devices
    logic to write a data pattern to a portion of the non-volatile memory device; and
    logic to read one or more bits from the portion of the non-volatile memory device a first number of times and a second number of times,
    wherein at least one bit of the one or more bits are to be marked for random number generation based at least partially on comparison of a number of flips by the at least one bit and a threshold value, wherein the number of flips by the at least one bit is to be determined based at least in part on read operations to be performed during the first number of times and the second number of times; and
    logic to update a moving read reference (MRR) offset value based at least partially on comparison of a threshold number of flips and the determined number of flips by the at least one bit, wherein the MRR offset value is to be updated after the read operations to be performed during the first number of times and before the read operations to be performed during the second number of times.

18. The system of claim 17, further comprising memory to store the number of flips by the at least one bit and location information of the at least one bit.

19. The system of claim 17, wherein the threshold value is to comprise an entropy quality threshold value.

20. The apparatus of claim 1, wherein the moving read reference offset value is to be used for the random number generation.

21. The apparatus of claim 1, wherein the MRR offset value is to be set to a value that is to produce a maximum number of flips in response to a comparison of the MRR offset value and the threshold number of flips.

* * * * *